April 13, 1965     J. R. BAILEY     3,177,962
VIBRATION ISOLATING SHOCK MOUNT FOR VEHICLE
Filed April 17, 1961     2 Sheets-Sheet 1

Jay R. Bailey, INVENTOR.
WHANN & McMANIGAL
Attorneys for Applicant

April 13, 1965   J. R. BAILEY   3,177,962
VIBRATION ISOLATING SHOCK MOUNT FOR VEHICLE
Filed April 17, 1961   2 Sheets-Sheet 2
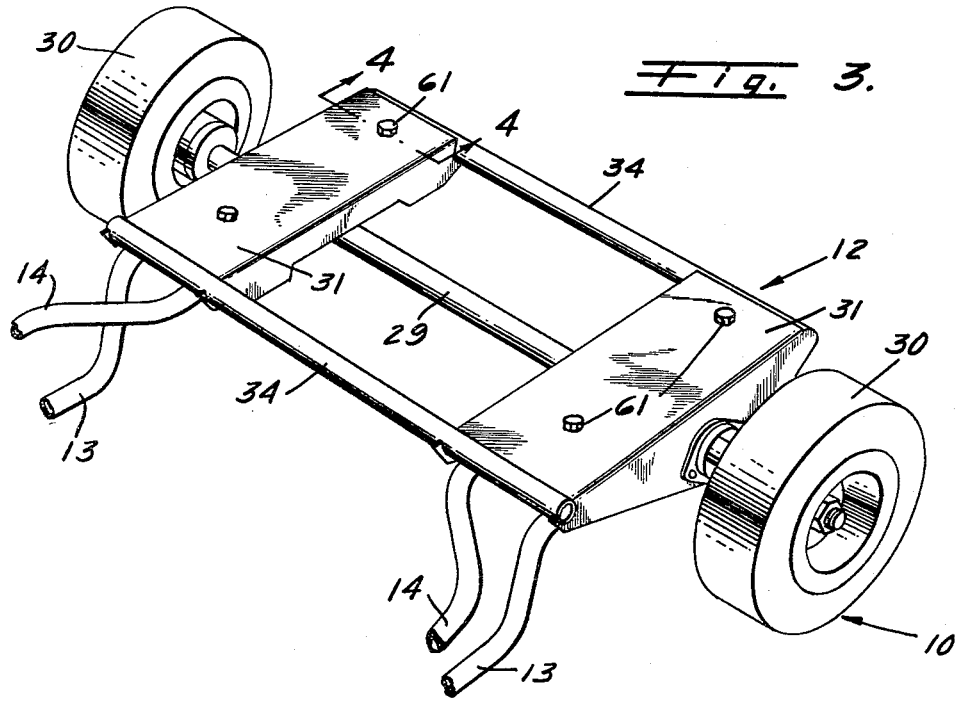
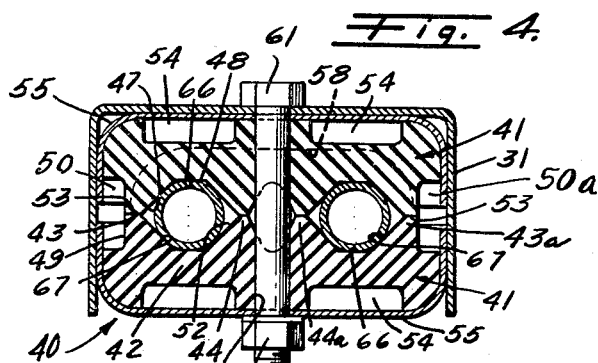
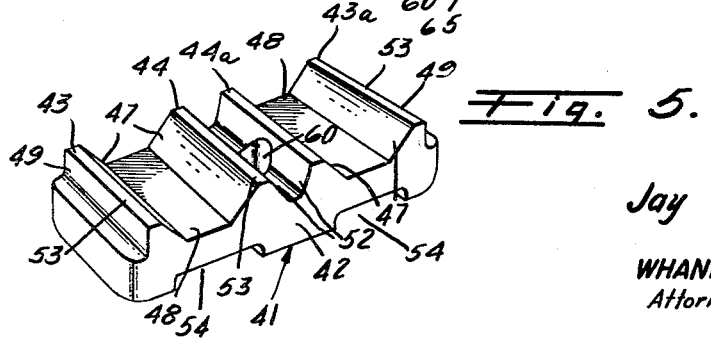
Jay R. Bailey,
INVENTOR.
WHANN & McMANIGAL
Attorneys for Applicant _United States Patent Office_ 3,177,962
Patented Apr. 13, 1965

3,177,962
VIBRATION ISOLATING SHOCK MOUNT
FOR VEHICLE
Jay R. Bailey, Palos Verdes Estates, Calif., assignor to McCulloch Corporation, Los Angeles, Calif., a corporation of Wisconsin
Filed Apr. 17, 1961, Ser. No. 103,393
4 Claims. (Cl. 180—11)

This invention relates to a vibration isolating shock mount and, more particularly, to such a shock mount by which one portion of a vehicle may be detachably connected to another portion.

Detachability of the rear axle and engine mount from the forward section of some vehicles, such as racing karts, is particularly desirable in that for a single forward body structure a number of different horse-powered rear axles and engine mounts may be substituted, each for the other. For example, a rear axle having a single engine mounted thereon may be replaced, according to the present invention, with a rear axle having two or three engines thereon, the number of engines being adapted to the type of use to be given to the kart.

Further, according to the present invention, the detachable rear section, which includes the rear axle, wheels, engine mounts and engine or engines, is secured to the forward section of the frame by means of gripping shock mounts which completely isolate the forward frame section from the rear or engine mount portion of the kart.

It is an object of the present invention to provide an improved kart.

It is another object of the present invention to provide an improved shock mount for vehicles by which one portion of the vehicle is completely vibration isolated from the other through the shock mount or mounts.

It is still another object of the present invention to provide a kart having a vibration-isolating, shock mounted detachable rear axle unit which permits the changing of rear sections so as to be able to race in different classes within a matter of a few minutes.

It is a further object of the invention to provide shock mounts for completely insulating one portion of the vehicle from the vibrations in another portion. That is, in the present invention shock mounts insulate engine vibration on the rear portion of the vehicle from the main or forward portion of the frame and from the steering wheel. This serves to sharply reduce both driver fatigue and mental fatigue so as to make the karts both longer lasting and more easily driven.

It is a still further object of the present invention to provide elastomeric shock mounts which react to loads in combined compression, bending and shear in the X, Y and Z axes.

It is another object of the present invention to provide elastomeric shock mounts having high unit loading at the contact points on tubes to which they are connected to thereby insure relative molecular motion within the elastomeric material itself, said molecular or working motion being essential for the proper absorption of vibrations. In the present invention, the elastomeric shock mounts are fitted, unbonded, in cup members, whereas in the prior art to attain the desired relative molecular or working motion in the elastomeric material to obtain the proper absorption of vibrations, it was necessary to bond the rubber to steel plates. Bonding, of course, required another step in the manufacture and, thus, increased the cost of the shock mounts.

It is, therefore, another object of the present invention to provide lower cost shock mounts and shock mounts in which the elastomeric material can be easily replaced without replacing the holding means.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIGURE 1 is a side elevational, partially cut away view of a kart employing the present invention;

FIG. 2 is a perspective exploded view of the rear end of the kart shown in FIG. 1, without the engine, illustrating the detachability of the rear axle portion;

FIG. 3 is a fragmentary perspective view of a kart showing its rear end secured to its forward or main frame portion;

FIG. 4 is a sectional view, taken as indicated by the line 4—4 of FIG. 3; and

FIG. 5 is a perspective view of a shock mount, according to the invention.

Referring again to the drawings, there is illustrated in FIG. 1 a kart, generally designated as 10, which is separable into a main frame or front portion 11 and a rear axle or engine mount portion 12. The front portion 11 is comprised of two pairs of longitudinal frame members 13 and 14, there being like members on both sides of the kart. The main frame is supported forwardly on the front wheels 16, which in turn support the steering mechanism 17, the seat 18, the throttle mechanism 19, and the unshown brake lines.

As may be best seen in FIG. 2, the rear end portions 22 and 23 of the frame members 13 and 14, respectively, are shown to be of tubular configuration in a parallel spaced relationship. The rear end portions 22 and 23 are secured at their forward portions by a transverse member 24 welded thereto, centrally by an elongated transverse member 25, and at their rear by a transverse member 28, the latter two of which are also welded to the members 22 and 23.

The detachable engine mount portion 12 is comprised of the rear axle 29 which is supported on the rear wheels 30, the axle in turn being bearing mounted in and supporting the two engine mount brackets 31. The brackets 31 are joined together by two parallel tubular members 34 to form an integral unit.

In FIG. 1, the engine or engines 35 are shown to be mounted on an engine mount bracket 31 by means of supports, such as upwardly extending member 36. The rear axle 29 is driven directly by the engine by the chain and sprocket means, designated generally as 37.

As best seen in FIGS. 2, 4 and 5, the front portion of the kart 11 is secured to the rear axle portion 12 by means of four pairs of shock mounts 40. Each shock mount is comprised of two elongated members 41 of rubber or other elastomeric material, arranged as shown in FIGS. 2 and 4, in face to face allochiral relationship. Each member 41, as best seen in FIGS. 4 and 5, has a central elongated body portion 42, and extending from it are two pairs of substantially allochiral projections 43, 44, and 44a, 43a. Each pair of projections, as 44 and 43, has a respective pair of inner, facing, outwardly sloping sides 47, which are spaced by a base portion 48. At the outer ends of member 41 are sides 49 forming outwardly facing, opposite sides to the sides 47. Similarly, inwardly of the two pairs of projections are outwardly facing, relative to the corresponding projections, opposite sides 52. Each inner side and its corresponding opposite side terminate at their outer ends in an outside face 53 which contacts a corresponding outside face in the other member 41 to prevent preloading.

In the face of the shock mount forming members 41, opposite that from which the projections extend, is a pair of generally channel-shaped cutaway portions 54 extending coextensively with the width of the member 41 and in alignment, transversely, with corresponding base portions 48. Similarly, outwardly of the recessed sides 49 are generally channel-shaped cutaway portions 50 and 50a, as shown in FIG. 4.

As best seen in FIGS. 2 and 4, each of the elastomeric members 41 are fitted in a generally rectangular-shaped cup 55, having cutaway channel-shaped side portions 58 to expose all of the transverse edges of the projections, the cutaway portion 54 facing the inner base portion of the cup.

To secure the forward frame portion 11 to the rearward or engine mount portion 12, the pairs of shock mount forming members 41 in the cups 55 are placed over and under the tubular memebrs 22 and 23 into the positions shown in FIG. 4 with bolt holes 59 in the cups 55 in alignment with bolt holes 60 in the elastomeric members 41 to receive a corresponding bolt 61 which previously was inserted through a corresponding hole 64 in the bracket 31. Thus, for example, in placing a rear shock mount on the rear end of a pair of tubular members 22 and 23 adjacent and in abutment with the transverse member 28, which affords the shock mount longitudinal support against rearward movement, the members 41 and cups 55 are placed against the latter and on the two members 22 and 23 to the rear of the member 25 so that the bolt 61 may pass through the space between the members 25 and 28.

When the shock mount is so formed above and below the members 22 and 23, the outside faces 53 of each of the members 41 are in contact with each other, the base portions 48 are in a tangential-line contact at 66 with the respective upper and lower surfaces of the members 22 and 23 and, similarly, the inner faces 47 are in tangential-line contact at 67 with the surfaces of members 22 and 23. This provides a high unit loading at the tangential contact points or lines to insure relative molecular or working motion within the elastomeric material as is required for the proper absorption of vibrations. Thus, when the four shock mounts are formed and secured to the rear engine mount portion of the kart, the forward portion is secured thereto by the four bolts 61, as shown in FIGS. 3 and 4.

Thus, by the structure disclosed, an entire new rear end and power supply may be added to the kart by the removal of the four bolts and the resecuring of the same bolts by the tightening of nuts 65 thereon, as shown in FIG. 4.

In operation, the shock mounts insulate the engine vibration from the frame and the steering wheel as a result of the high unit stress placed upon the tangential-line contacts coupled with the deflections permitted by the cutaway portions 54, both of which permit an ideal relative molecular or working motion of the elastomeric material in the shock mounts to absorb a maximum of the aforesaid vibrations.

It should be realized that this structure is fully secure in that the cups 55 provide up and down and endwise stopping means for the rubber and the transverse members 24, 25 and 28 limit the movement of the bolts 61 if an aged member 41 of elastomeric material should fail.

It is clear that other forms of the present shock mount structures and rapidly detachable means may be provided in a fore and aft separable vehicle without departing from the inventive principles which are disclosed herein for the purpose of illustration and example only.

I claim:

1. In a vehicle frame, a plurality of shock mounts vibration-isolating one portion of said frame from another, each of said shock mounts comprising: a pair of elastomeric allochiral bodies secured to one portion of the frame and in gripping engagement with a pair of spaced tubular members on said other portion of said frame, said gripping engagement holding said portions of said frame together; each of said bodies comprising an elongated central portion; a pair of spaced, transverse, portions on one side of said central portion for receiving said respective spaced tubular members; each of said receiving portions comprising a pair of spaced, substantially allochiral projections having inner, facing, outwardly sloping sides extending from one side of said central portion; opposite sides, outwardly facing on said projections extending from said one side of said central portion; a base portion on said one side of said central portion extending between the inner ends of each pair of respective inner facing sides, each base portion being in alignment with a corresponding base portion on the other body of said shock mount, each of said base portions being in tangential-line contact with a corresponding tubular member, said tubular member being in contact with respective inner sides on each of said bodies; a pair of cutaway portions in said central portion in a side thereof opposite said one side and one cutaway portion being opposite each respective base portion and in coextensive alignment with said respective tangential-line contacts; a bolt hole extending through said allochiral bodies from one side of each of its opposite side in said space between said receiving portions, said holes being in alignment; a pair of allochirally arranged cup members fitted on said opposite sides of said central portions, said cup members having holes therein in alignment with said bolt holes in said allochiral bodies; and a bolt extending from said one portion of said vehicle frame through said bodies and said cup members and having a nut in tightened threaded engagement therewith on its end whereby said pair of spaced tubular members is held in said gripping engagement.

2. In a vehicle: a main frame; a rear portion of said vehicle detachable from connecting portions of said main frame, said connecting portions comprising spaced, parallel, cylindrical tubular members in gripping engagement in tubular receiving portions in shock mounts secured to said rear portion to hold said vehicle together; each of said shock mounts comprising a pair of elastomeric allochiral bodies secured to said rear portion of the vehicle; each of said bodies comprising an elongated central portion; a pair of spaced, transverse portions on one side of said central portion for receiving said respective spaced tubular members; each of said receiving portions comprising a pair of spaced, substantially allochiral projections having inner, facing, outwardly sloping sides extending from one side of said central portion; opposite sides, outwardly facing on said projections extending from said one side of said central portion; a base portion on said one side of said central portion extending between the inner ends of each pair of respective inner facing sides, each base portion being in alignment with a corresponding base portion on the other body of said shock mount, each of said base portions being in tangential-line contact with a corresponding tubular member, said tubular member being in contact with respective inner sides on each of said bodies; a pair of cutaway portions in said central portion in a side thereof opposite said one side and one cutaway portion being opposite each respective base portion and in coextensive alignment with said respective tangential-line contacts; a bolt hole extending through said allochiral bodies from one side of each to its opposite side in said space between said receiving portions, said holes being in alignment; a pair of allochirally arranged cup members fitted on said opposite sides of said central portions, said cup members having holes therein in alignment with said bolt holes in said allochiral bodies; and a bolt extending from said rear portion of said vehicle through said bodies and said cup members and having a nut in tightened threaded engagement therewith on its end whereby said tubular members of said main frame are held in said gripping engagement.

3. In a vehicle: a main frame; a rear portion of said vehicle detachable from a pair of transversely spaced connecting portions on said main frame; each connecting portion including a pair of spaced, generally cylindrical tubes secured together transversely by a spacer, said rear portion including a rear axle of said vehicle and wheels on the ends of said axle, said axle extending through an engine mount in which it is bearing mounted; an engine secured on said mount and connected to drive said axle and said vehicle; a shock mount connecting means securing each connecting portion to said engine mount; each means comprising a pair of elastomeric allochiral bodies secured to said rear portion of the frame and in gripping engagement with a respective pair of cylindrical tubes in a connecting portion, said gripping engagement holding said portions of said frame together; each of said bodies comprising an elongated central portion; a pair of spaced, transverse, portions on said one side of said central portion for receiving said respective cylindrical tubes; each of said receiving portions comprising a pair of spaced, substantially allochiral projections having inner, facing, outwardly sloping sides extending from one side of said central portions; opposite sides, outwardly facing on said projections extending from one side of said central portion; a base portion on said one side of said central portion extending between the inner ends of each pair of respective inner facing sides, each base portion being in alignment with a corresponding base portion on the other body of said means, each of said base portions being in tangential-line contact with a correesponding one of said tubes, said tubes being in contact with respective inner sides on each of said bodies; a pair of cutaway portions in said central portion in a side thereof opposite said one side and one cutaway portion being opposite each respective base portion and in coextensive alignment with said respective tangential-line contact; a bolt hole extending through said allochiral bodies from one side of each to its opposite side in said space between said receiving portions, said holes being in alignment; a pair of allochirally arranged cup members fitted on said opposite sides of said central portions, said cup members having holes therein in alignment with said bolt holes in said allochiral bodies; and a bolt extending from said rear portion of said vehicle frame through said bodies and said cup members and having a nut in tightened threaded engagement therewith on its end whereby each pair of tubes is held in said gripping engagement.

4. The invention according to claim 1 in which the opposite side on the outer projection of each receiving portion is recessed with respect to an adjacent outer surface of the respective body, and in which each pair of projections on one body has faces adjacent respective inner sides in contact with corresponding faces on the other body.

References Cited by the Examiner
UNITED STATES PATENTS

| | | | |
|---|---|---|---|
| 1,930,067 | 10/33 | Tibbetts | 287—85 X |
| 2,308,969 | 1/43 | Riesing | 248—358 X |
| 2,361,943 | 11/44 | Issoglio et al. | 248—68 X |
| 2,756,834 | 7/56 | Dauben | 180—11 X |
| 2,919,139 | 12/59 | Rupp | 280—106 |

A. HARRY LEVY, *Primary Examiner.*

PHILIP ARNOLD, *Examiner.*